(12) United States Patent
Kurra et al.

(10) Patent No.: US 9,990,651 B2
(45) Date of Patent: Jun. 5, 2018

(54) METHOD AND APPARATUS FOR SELECTIVE DELIVERY OF ADS BASED ON FACTORS INCLUDING SITE CLUSTERING

(75) Inventors: Goutham Kurra, San Francisco, CA (US); Wentong Li, Saratoga, CA (US); Quan Lu, Belmont, CA (US)

(73) Assignee: Amobee, Inc., Redwood City, CA (US)

( * ) Notice: Subject to any disclaimer, the term of this patent is extended or adjusted under 35 U.S.C. 154(b) by 816 days.

(21) Appl. No.: 12/948,577

(22) Filed: Nov. 17, 2010

(65) Prior Publication Data
US 2012/0123862 A1 May 17, 2012

(51) Int. Cl.
*G06Q 30/00* (2012.01)
*G06Q 30/02* (2012.01)

(52) U.S. Cl.
CPC ..... *G06Q 30/0253* (2013.01); *G06Q 30/0254* (2013.01); *G06Q 30/0275* (2013.01)

(58) Field of Classification Search
USPC ......... 705/14.51, 14.43, 14.41, 14.71, 14.73, 705/14.54, 14.66, 14.69, 14.1, 14.4, 705/14.42, 14.49, 26.1, 7.29, 14.13, 705/14.25, 14.48, 14.52, 14.55, 14.6, 705/26.3, 37, 7.32, 7.33, 7.35, 7.37; 707/999.005, 723, 751; 706/12; 709/218; 713/182
See application file for complete search history.

(56) References Cited

U.S. PATENT DOCUMENTS

| 5,636,346 | A | 6/1997 | Saxe |
| 5,991,735 | A | 11/1999 | Gerace |
| 6,460,036 | B1 * | 10/2002 | Herz ............................ 707/748 |
| 6,615,039 | B1 | 9/2003 | Eldering |
| 7,331,057 | B2 | 2/2008 | Eldering et al. |
| 7,403,910 | B1 | 6/2008 | Hastings et al. |
| 7,472,102 | B1 * | 12/2008 | Heckerman et al. ........... 706/47 |

(Continued)

FOREIGN PATENT DOCUMENTS

| CN | 1303569 | 7/2001 |
| CN | 1156161 | 6/2004 |

(Continued)

OTHER PUBLICATIONS

Payne T., David E., Jennings N., Sharifi M; Auction Mechanisms for Efficient Advertisement Selection on Public Displays, University of Southampton, UK; date: unknown.

(Continued)

*Primary Examiner* — Luis A Brown
(74) *Attorney, Agent, or Firm* — Kwan & Olynick LLP (57) ABSTRACT

For each of various sites, a mathematical representation is computed according to prescribed characteristics of users that have conducted one or more predetermined types of interaction with the site. Cluster of the sites are identified whose computed representations are similar according to prescribed criteria. Responsive to notification of an opportunity to deliver unidentified advertising to a given user via a given site, at least one ad is selected based upon factors including the ad having a prescribed performance history at one or more clusters containing the given site. The selected ad is transmitted to the given user at the given site, or a bid is transmitted for such placement of the ad.

24 Claims, 6 Drawing Sheets

(56) References Cited

U.S. PATENT DOCUMENTS

| | | |
|---|---|---|
| 7,542,951 B1 | 6/2009 | Chakrabarti et al. |
| 7,584,159 B1 | 9/2009 | Chakrabarti et al. |
| 7,617,127 B2 | 11/2009 | Hunt et al. |
| 7,689,457 B2 | 3/2010 | Chan et al. |
| 7,698,236 B2 | 4/2010 | Cox et al. |
| 2002/0072966 A1 | 6/2002 | Eldering et al. |
| 2002/0083444 A1 | 6/2002 | Blasko et al. |
| 2002/0087980 A1 | 7/2002 | Eldering et al. |
| 2002/0194058 A1 | 12/2002 | Eldering |
| 2003/0004810 A1 | 1/2003 | Eldering |
| 2004/0190448 A1* | 9/2004 | Fishteyn et al. ............. 370/229 |
| 2005/0193410 A1 | 9/2005 | Eldering |
| 2006/0212447 A1* | 9/2006 | Davis et al. ..................... 707/6 |
| 2007/0282785 A1 | 12/2007 | Cox et al. |
| 2008/0059390 A1 | 3/2008 | Cox et al. |
| 2008/0249832 A1* | 10/2008 | Richardson et al. ........... 705/10 |
| 2009/0024470 A1 | 1/2009 | Mandelson et al. |
| 2009/0055268 A1 | 2/2009 | Knoller et al. |
| 2009/0192874 A1 | 7/2009 | Powles et al. |
| 2010/0106606 A1* | 4/2010 | Filice et al. ............... 705/14.73 |
| 2012/0173338 A1† | 7/2012 | Ariel |

FOREIGN PATENT DOCUMENTS

| | | |
|---|---|---|
| CN | 1711773 | 12/2005 |
| CN | 100438616 | 11/2008 |
| CN | 101454793 | 6/2009 |
| CN | 101484890 | 7/2009 |
| EP | 0895685 B1 | 6/2005 |
| WO | WO9741673 A2 | 11/1997 |
| WO | WO2007131069 A2 | 11/2007 |
| WO | WO2007142771 A1 | 12/2007 |
| WO | WO2008138144 A1 | 11/2008 |
| WO | WO2009024874 | 2/2009 |
| WO | WO2010087882 | 5/2010 |

OTHER PUBLICATIONS

Kazienko, P.; Multi-Agent System for Web Advertising, Wroclaw University of Technology, Institute of Applied Informatics, Wybrzeze S. Wyspianskiego 27, 50-370 Wroclaw, Poland; date: unknown.

Kate A. Smith, Alan Ng, Web Page Clustering Using a Self-Organizing Map of User Navigation Patterns, pp. 245-256, May 2003, Elsevier Science BV.†

* cited by examiner
† cited by third party

METHOD AND APPARATUS FOR SELECTIVE DELIVERY OF ADS BASED ON FACTORS INCLUDING SITE CLUSTERING

BACKGROUND OF THE INVENTION

1. Field of the Invention

The invention relates to digital and online advertising, and more particularly, to the selection and delivery of ads for delivery into interactive content presented to users of digital data processing devices.

2. Description of the Related Art

The field of advertising has changed drastically as a result of advancements in technology, such as the popularity of mobile devices, the decline of print media, and the widespread use of the worldwide web. Electronic advertisements ("ads") now appear in web sites, video clips, emails, automated applications that gather information via the Internet, and many other locations, media, and formats.

One challenge is how to target ads to users. Vendors of products and services have an interest in delivering their ads to the users that are mostly likely to purchase their products and services. Advertisers, hired by such vendors, are similarly seeking the same users because vendors typically pay advertisers based on the response or level of interest generated by such ads.

One approach to targeting ads classifies web sites or web pages or mobile applications based on the content. In the case of a web page, a web crawler or indexer or other software program scans web page text and analyzes the text to determine the topic of the web page. In a specific example, the web crawler may find that a given web page is focused on selling and reviewing digital cameras, and therefore the web site is associated with a "digital camera" classification. These web site classifications are later used to target ads to web users that visit this site. For example, knowing that a given web site concerns digital cameras, when choosing ads to deliver into that web site, an advertiser may consider historical performance of ads on digital camera web sites in choosing an ad for the current web site.

Although this approach works well in some situations, there can be problems. For instance, it can be difficult to classify some web sites or web pages or mobile applications. One example is a political web site whose text does not include language clearly demonstrating any leanings toward one particular party or issue. Further, even if classification can be achieved based on the content, the classification may not be useful from an advertiser's perspective. For example, a content classification of "News Blog" may not be enough to easily determine which ad to play on such content.

Another difficulty is where a web page or web site or mobile application appeals to a niche audience. For instance, a web site may be highly focused on a specialty such as large format Southern hemisphere celestial photography. Even though the content of the web site fairly suggests the web site's topic, and is therefore discernable to web crawlers and the like, advertisers may lack sufficient historical performance data for ads at this web site or content category to make any meaningful choice of ad to deliver there.

Besides targeting ads based on content, another approach considers the users. Relatedly, users are commonly classified according to their topics of interest, demographics (such as age, gender, income range, education, geography, and the like), web browsing time, past purchases, web browsing behavior, the user's browser, operating system, and many more items. These user classifications are later used to target ads to the individual users. For example, knowing that a given user is interested in digital cameras, an advertiser may consider the historical performance of ads on digital camera fans when choosing an ad to deliver to that user. The additional issue of the content of the current web page or web site or mobile application may be another factor in the decision, or user classification may be sufficient by itself.

Although the audience classification approach works well in some situations, there can be problems. For instance, as to a particular user, the advertiser may lack any information or sufficient information about that user.

From the foregoing, it can be seen that the known ad targeting systems have certain benefits, and have proven useful in many circumstances. Nevertheless, there are other situations where these approaches are not completely adequate due to certain unsolved problems.

SUMMARY OF THE INVENTION

For each of various sites, a mathematical representation is computed according to prescribed characteristics of users that have visited the site or conducted one or more predetermined types of interaction with the site. Clusters of the sites are identified whose computed representations are similar according to prescribed criteria. This essentially characterizes sites in terms of the profiles of their audience rather than the content. Responsive to notification of an opportunity to deliver unidentified advertising to a given user via a given site, at least one ad is selected based upon factors including the ad having a prescribed performance history at one or more clusters containing the given site. The selected ad is transmitted to the given user at the given site, or a bid is transmitted for such placement of the ad.

The invention may be implemented as one or more methods, articles of manufacture, or apparatuses. Functional components may be implemented by one or more modules of software, hardware, firmware, circuitry, or any combination of the foregoing.

DETAILED DESCRIPTION

The nature, objectives, and advantages of the invention will become more apparent to those skilled in the art after considering the following detailed description in connection with the accompanying drawings.

Hardware Components and Interconnections

Figure 1:
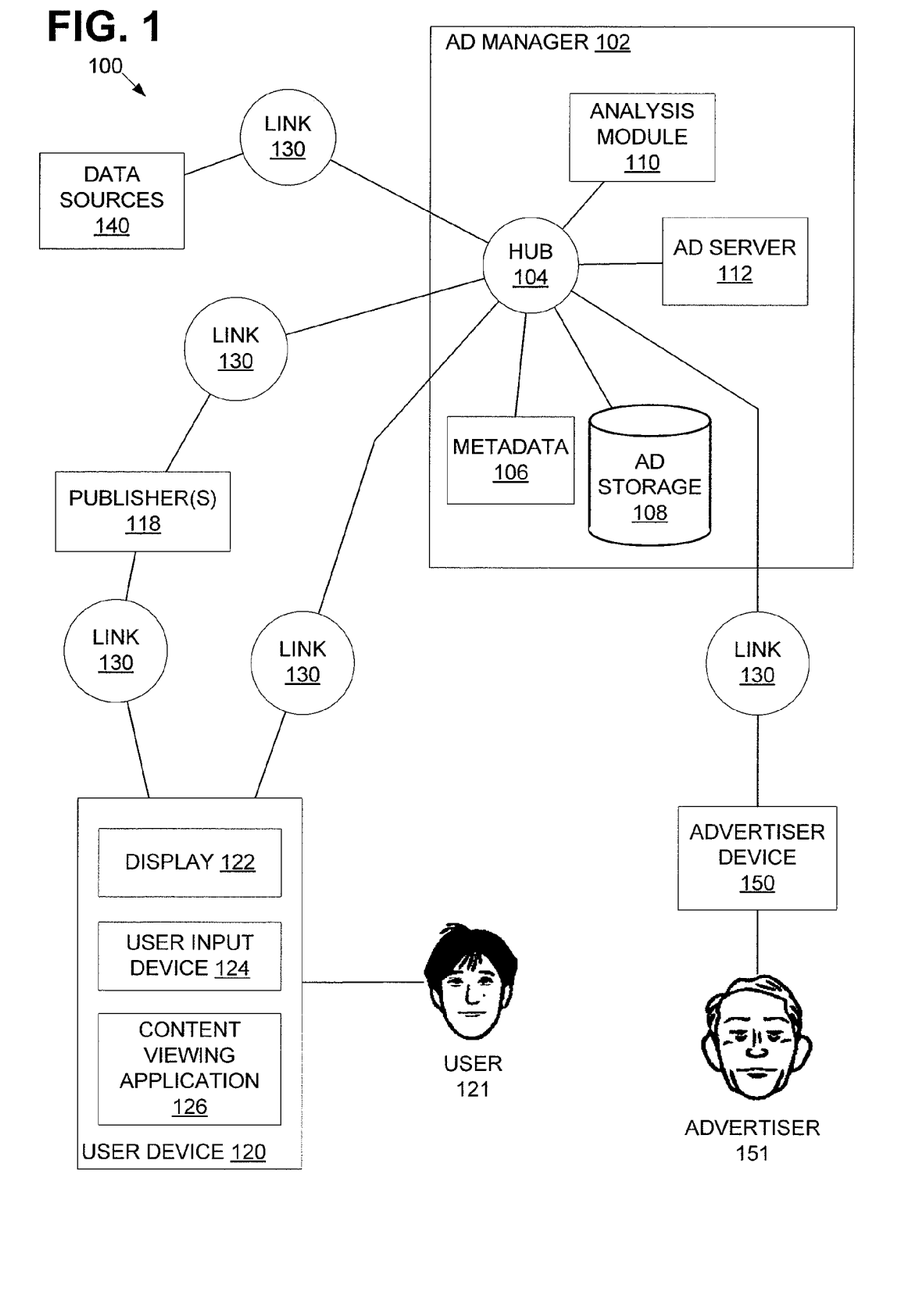
FIG. 1 is a block diagram of the components and interconnections of a ad delivery system according to an embodiment of the invention.

Overall Structure
 Introduction
 FIG. 1 shows an advertising system 100 that delivers ads to users. The system 100 includes an ad manager 102, one or more publishers 118, data sources 140, one or more advertiser devices such as 150, and multiple user devices such as 120. For explanatory purposes, a given ad is discussed, although in practice operation of the system may involve many ads. In this example, the given ad is rendered by the ad manager 102 and optionally the publisher 118, and ultimately viewed at the user device 120.
 Advertiser Device
 The advertiser device 150 provides a mechanism for an advertiser 151 to send and receive data to and from the ad manager 102. The content and manner of exchanging such information is described in greater detail below.
 The device 150 may comprise any laptop, desktop, mobile computing device, workstation, slate computing device, or other equipment. The device 150 is connected to the ad manager 102 by a link 130. The link 130 is embodied by the public Internet in the examples herein, and accordingly the different instances of the link 130 in FIG. 1 also refer to the Internet in this example. Nevertheless, separate links may be used, as may be satisfied by any wired or wireless connection or network. Some wired networks include a local area network (LAN), a wide area network (WAN), a home network, and the like. Some wireless networks include a wireless local area network (WLAN), Wi-Fi, or wireless wide area network (WWAN), mobile broadband, and the like.
 The advertiser 151 is a person or team from an entity affiliated with one or more ads under management of the ad manager 102. Some examples of this entity include an advertising or marketing or public relations company that has sponsored or otherwise place ads under management by the ad manager 102. Other examples include vendors of products or services that are the subject of such ads. Without any intended limitation, the party that submitted an advertisement for management by the ad manager 102 is referred to as an "advertiser."
 Although a single device 150 is illustrated in this example, an implementation of the system 100 would include many advertiser devices 150 for the use of many advertisers such as 151.
 User Device
 The user device 120 may be implemented by a laptop or desktop computer, personal data assistant (PDA), mobile telephone, slate computing device, television, Internet-connected entertainment device, or any other device capable of delivering interactive content from the Internet to a user 121.
 The user device 120 may be communicatively coupled to the ad manager 102 and the publishers 118 via one or more links such as the link 130. As discussed in greater detail below, the user device 120 includes one or more content viewing applications 126, configured to view interactive content obtained via the Internet from "sites." Some examples of sites include web sites, web pages, e-books or pages or chapters or other subdivisions of e-books, television programs, automated applications programmed to gather information via the Internet and display gathered information to users, or other interactive content delivery site. The device 120 may receive such content on push or pull basis or a combination of these depending upon the nature of the content and the content viewing application being used.
 Accordingly, examples of the content viewing applications 126 include e-book viewers, web browsers, mobile applications ("mobile apps"), televisions capable of displaying television programs with interactive content, and automated applications programmed to gather information via the Internet and interactively display gathered information to the user 121. Some more specific examples of content viewing applications include a Mozilla™ Firefox™ browser, Skype™ mobile or desktop app, Netflix™ movie streaming app, iTunes™ mobile or desktop app, and any thousands of mobile or desktop apps with interactive content delivery to a personal computer, Apple iPhone™, Google Android™, or other hardware platform such as the embodiments of user device 120 described above.
 The device 120 also includes a display 122, comprising a device such as a thin film transistor liquid crystal or other LCD, plasma, CRT, or other device for visually presenting machine-readable output representing at least text and graphics. Although referred to in the singular for ease of reading, there may be multiple displays 120 if appropriate to the manner in which the client device 120 is being implemented. In one example, the display 120 is integrated into the client device 120, as is common for mobile telephones
 The client device 120 also includes a user input device 124. Some examples include a reduced-size keyboard, nine key or twelve key or other keypad, telephone keypad, and the like. Another example of device 124 is a touch-sensitive display screen operable with a keyboard or keypad presented in the display 120. Furthermore, besides typing input devices, the device 120 may be implemented by equipment to receive user input by handwriting, sound, voice, eye gaze tracking, brain waves, or any other mechanism. Although referred to in the singular for ease of reading, the user input device 124 may be implemented by multiple user input mechanisms.
 Although one user device 120 is shown in the current example, an implementation of the system 100 may include many user devices 120 in communication with various publishers 118 and the ad manager 102.
 Publisher
 The publisher 118 comprises a content server that provides content to user devices. In implementation, there will be many publishers 118, but one is shown in this example for ease of illustration. One example of a publisher is a web-accessible service provider or search engine or a web portal, in which case the provided content includes hypermedia content. Some examples of these publishers include online newspapers, online magazines, web portals, web search engines, and the like.
 A different example of publisher is a content server that provides information automatically or on demand to mobile apps and other content viewing applications such as 126, where such content may or may not include hypermedia content. Some examples of these publishers include Facebook™ for mobile apps, Twitter™, the New York Times™ app, Skype™, Instant Messaging programs, and the like.
 The publishers 118 may also include blends of any of the foregoing types or examples. Publishers 118 may provide content to user devices 120 on a push basis, pull basis, or a combination of these for different circumstances.
 Sources
 The system 100 also includes various data sources 140, which provide certain types of data used by the ad manager 102. The data sources 140 may include computers, servers, storage diskettes, circuit memory, or any other mechanism for providing the desired data. Further examples of the sources 140 include computers providing data via web sites or pages, email, FTP sites, or any other means that is suitable for the purposes discussed herein. The equipment of 140 may be provided by web portals, online service providers, search engines, data aggregators, or other entities with the desired data. Additional data may be received from advertisers 151 via the advertiser devices 150.

In one example, the data provided by sources 140 includes data describing various characteristics of users such as 121, and a listing of sites with which some or all of these users have interacted. The data sources 140 may further provide certain performance history information as discussed in greater detail below.

Ad Manager

The ad manager 102 delivers ads to be embedded or included or otherwise associated with content provided by sites to the user devices 120. Delivery of these ads may occur by some or all of the following: from the ad manager 102 to user devices 120 via publishers 118, from the ad manager 102 directly to content viewing applications 126 of user devices 120, or from the ad manager 102 to publisher 118 or user device 120 via an agent or intermediate such as an ad exchange.

The ad manager includes an analysis module 110, ad server 112, metadata 106, and ad storage 108. Each of these is coupled to a hub 104, which provides data routing and interconnectivity between the components connected to it. Accordingly, the hub 104 comprises equipment such as a data router, input/output device, server, computer, software program, or other module. In one example, the hub 104 is omitted, and the hub functions are incorporated into another component such as 110 or 112.

The ad storage 108 comprises digital data storage that contains ads being managed by the manager 102. The ads in 108 may be embodied by text, graphics, static images, animation, video content, multimedia content, or a combination of these. Some or all of the ads 108 may include non-visual aspects, such as sound. The ads in storage 108 may be referred to as an ad "inventory." The ads 108 may be designed for delivery in the form of a banner ad, pop-out ad, slide-out ad, or any other interactive format that is appropriate for the purposes of this disclosure.

Metadata 106 comprises digital data storage that contains data such as information describing or associated with the ads 108, data received from the sources 140, and any data created by further processing or analyzing or manipulating data from the sources 140. As for the ads 108, the metadata 106 may identify the products and services associated with each ad 108, one or more topics related to each ad 108, and any other information describing any desired properties of the ads 108.

The ad server 112 comprises a machine such as data server for retrieving and transmitting ads from 108 to the appropriate destination for delivery. The analysis module 110 comprises a computing module that performs various data analysis tasks as explained in greater detail below. The module 110 may be implemented by hardware that is shared with the ad server 112 and/or hub 104, or it may be comprise a separate laptop, desktop, mobile computing device, workstation, mainframe computer, slate computing device, program, or other equipment capable of performing the computations described herein.

The individual computing components of the manager 102, such as 110 and 112 may be implemented by a one or more modules of hardware, firmware, software, or a combination of these. In this respect, some exemplary processing devices and storage devices are discussed below in conjunction with FIGS. 2-4.

Exemplary Digital Data Processing Apparatus

Figure 2:
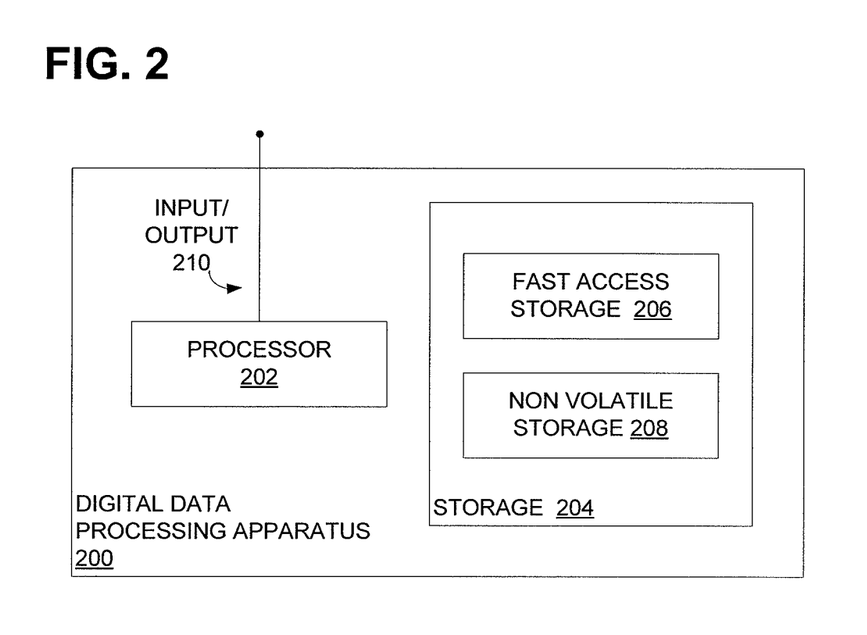
FIG. 2 is a block diagram of a digital data processing machine according to an embodiment of the invention.

As mentioned above, the various data processing entities of FIG. 1 may be implemented by various processing engines. FIG. 2 shows one example, in the form of a digital data processing apparatus 200. The apparatus 200 may be implemented by a personal computer, customer circuit board, workstation, notebook computer, controller, microcontroller, state machine, or other processing machine appropriate to the requirements of the tasks explained herein. The apparatus 200 includes a processor 202, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 202 may also be implemented as a combination of computing devices, such as a combination of a DSP and a microprocessor, a plurality of microprocessors, one or more microprocessors in conjunction with a DSP core, or any other such configuration.

The processor is coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 such as 106 and 108 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry In contrast to storage media that contain machine-executable instructions, as described above, a different embodiment uses logic circuitry to implement processing features of some or all of the components in the system 100.

Figures 3, 4:
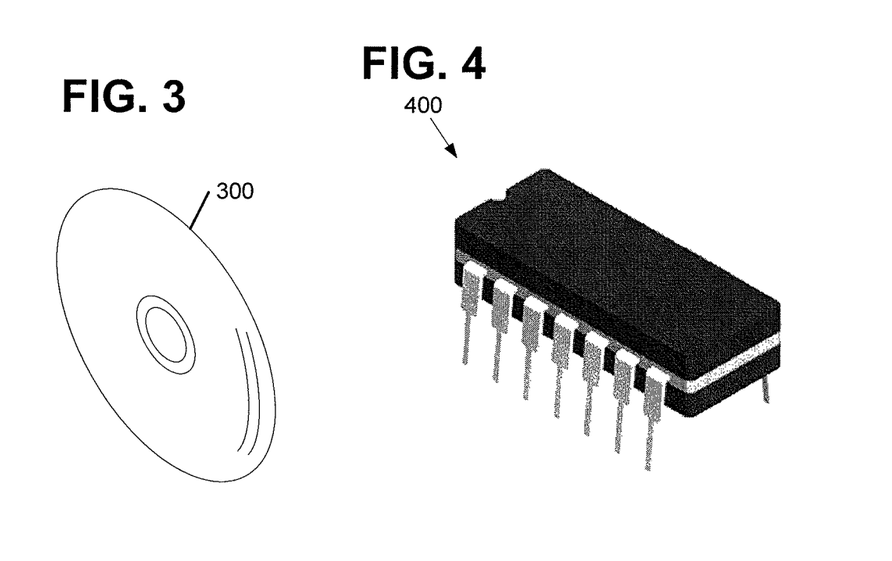
FIG. 3 shows an exemplary storage medium according to an embodiment of the invention.
FIG. 4 is a perspective view of exemplary logic circuitry according to an embodiment of the invention.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 4 shows an example of logic circuitry in the form of an integrated circuit 400.

Operation

Having described the structural features of the present disclosure, some operational aspect of the disclosure will now be described. The steps of any method, process, or algorithm described in connection with the embodiments disclosed herein may be embodied directly in hardware, firmware, circuitry, software executed by hardware, or any combination of these.

Example of Method Operations

Introduction

Figure 5:
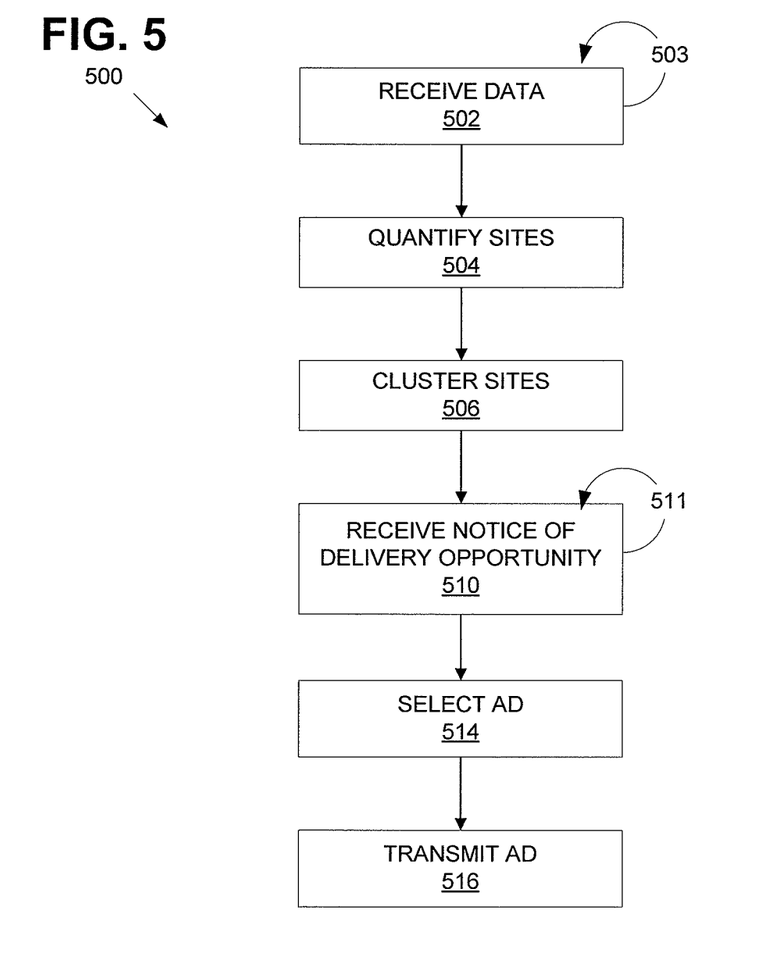
FIG. 5 is a flowchart of a method for delivering ads according to an embodiment of the invention.

FIG. 5 depicts a flowchart of operations 500 according to one exemplary method of this disclosure. Broadly, these operations selectively deliver ads based upon various data and analysis, including site clustering as described in greater detail below. For ease of explanation, but without any intended limitation, the operations 500 are described in the specific context of the system 100 described above.

Receive Data

In step 502, the ad manager 102 receives data from the sources 140. More particularly, in step 502 the module 110 receives data from the sources via the link 130 and hub 104. The module 110 stores the received data in 106.

Figure 8:
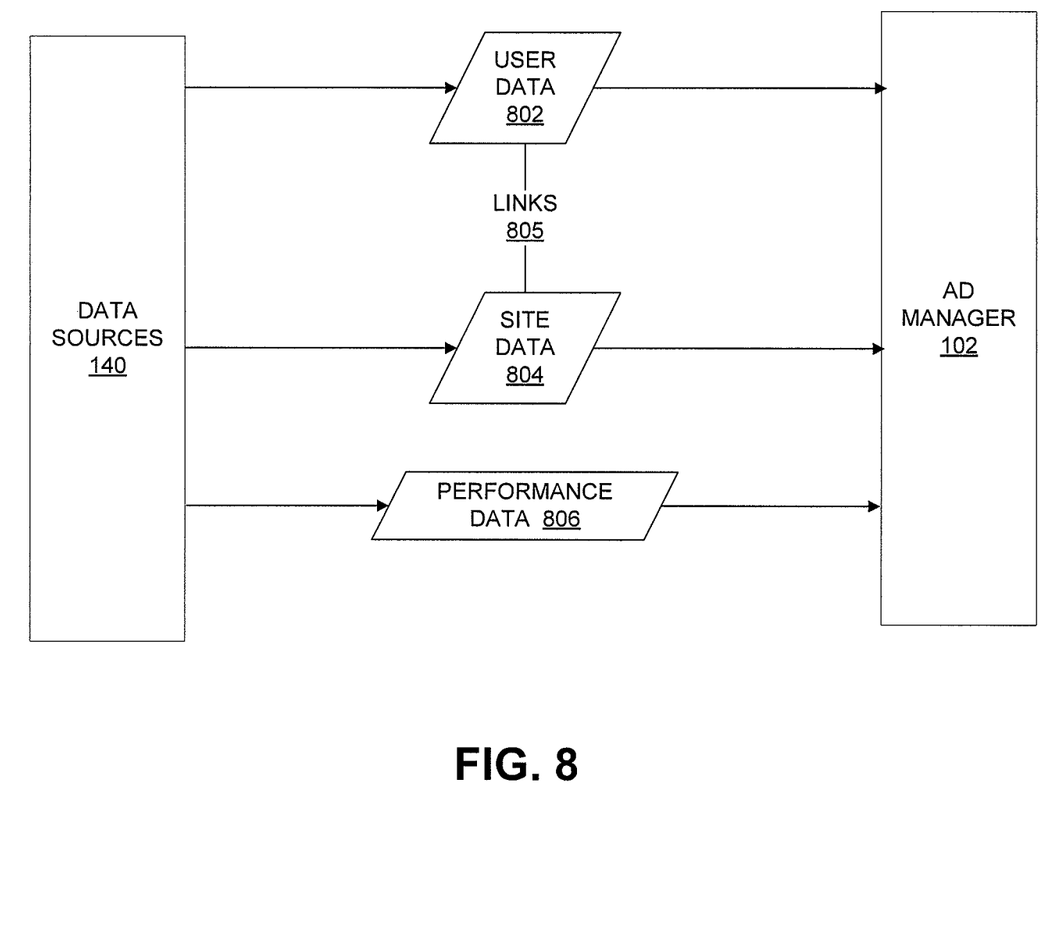
FIG. 8 is a diagram illustrating data received at an ad manager according to an embodiment of the invention.

The received data includes, but is not limited to data 802 describing prescribed characteristics of users, as shown in FIG. 8, and data 804 listing various sites, also as shown in FIG. 8. In an embodiment, the received data may further include data 806 including performance history of ads at specified sites or groups of sites.

Data 802, as mentioned above, describes users. In an example, data 802 includes some or all of the following for some or all of the users listed in the data 802: name or other identifier, gender, age, browsing history including topics of demonstrated interest to that user, purchase history, user geographical location, income range, other user demographics, habits of browsing or content viewing or invoking content viewing application including active and inactive times, and the like. The foregoing list is given without any intended limitation, as the user data may further include other types of information as well, as may be apparent to ordinarily skilled artisans having the benefit of this disclosure.

Data 804, as mentioned above, lists sites. Some or all of the sites in the listing 804 are sites where one or more of the users from 802 have conducted one or more interactions of prescribed types. These prescribed types of interactions may include one or more of the following: (1) one or more interactions with a given site where a user from 802 visited that site, (2) one or more interactions where a user from 802 was served an impression at the given site, (3) one or more interactions where a user from 802 performed a click-through of an ad impression served at the given site, (4) one or more interactions where a user from 802 executed a purchase or other activity that the advertiser considers valuable after initially receiving an impression or performing a click-through at the given site. Other examples of interactions include a user leaving a comment at a site, conducting a search at a site, etc. The examples are given without any intended limitation, as many further examples of the prescribed types of interactions may be implemented, as may be apparent to ordinarily skilled artisans having the benefit of this disclosure.

Site data 804 may or may not include information classifying content of the sites in 804, for instance classifying a given web site as a "camera" web site. One advantage of the method 500 is that it does not require content classification, and therefore is still beneficial for sites that are difficult to content-classify and sites that have experienced few documented visits. Therefore, for one or more sites in 804, the data 804 may be include data other than information classifying those sites. In a different example, such information may be present in 804 after all.

The types of the prescribed interactions mentioned above may be fixed, or they may be varied by the ad manager 102 or the sources 140 from time to time. In one example, the prescribed interactions are fixed when the ad manager 102 is constructed, configured, installed, booted, etc. In another example, these are subject to change under control of an administrator of the manager 102.

Along with the data 802, 804, there are links 805 between information in the data 802, 804. Namely, the links 805 connect sites 804 with those of the users 802 that have engaged in the prescribed types of interactions with those respective sites 804. For example, if a user visited a web site, and this satisfies the requirements of a prescribed type of interaction, then there is a link 805 between this user and the visited web site. These links 805 may be implemented by further data contained in 802, or data contained in 804, or an external coupling, indexing, cross-reference, or other link between 802, 804.

Data 806, as mentioned above, includes performance history of ads at specified sites. In an example, this includes the performance history of some or all of the ads that are stored in 108 and available to be delivered to users such 121. As for performance history, one example of this is click-through rate ("CTR"), which is the number of clicks on an ad divided by the number of times the ad was delivered ("impressions"). Another example of performance history includes conversion rate, such as any of the following initiated by clicking and/or viewing an online ad: sale of a product, membership registration, newsletter subscription, software download, or other desired action. Different or additional measures of performance may be implemented, as will be apparent to ordinarily skilled artisans having the benefit of this disclosure.

Any or all of data 802, 804, 806 may arrive from sources 140 such as publishers, portals, online service providers, search engines, data aggregators, or other sources of relevant data that is appropriate for the described purposes. In contrast or addition to the outside sources 140, some or all of data 802, 804, 806 may be obtained from the ad manager 102's own history activity in serving the ads 108.

As shown by 503, performance of step 502 may be repeated on a periodic, non-periodic, event-driven, or other basis. Moreover, data may be received from the sources 140 on a push or pull basis, or a combination or mixture of these.

Quantify Sites

In step 504, the analysis module 110 quantifies the sites represented in the data 804. Namely, for some or all of the sites listed in the data 804, the module 110 employs the data 802 and 804 to compute a mathematical representation of each site. The representation of each site is computed according to characteristics of users that have conducted one or more of the predetermined types of interactions with that site. More particularly, the representations of the sites 804 are computed according to prescribed characteristics of the users 802 linked to those sites by 805. The computation of this representation according to step 504 is explained in greater detail, with reference to the operations 900 of FIG. 9.

Figures 9, 10:
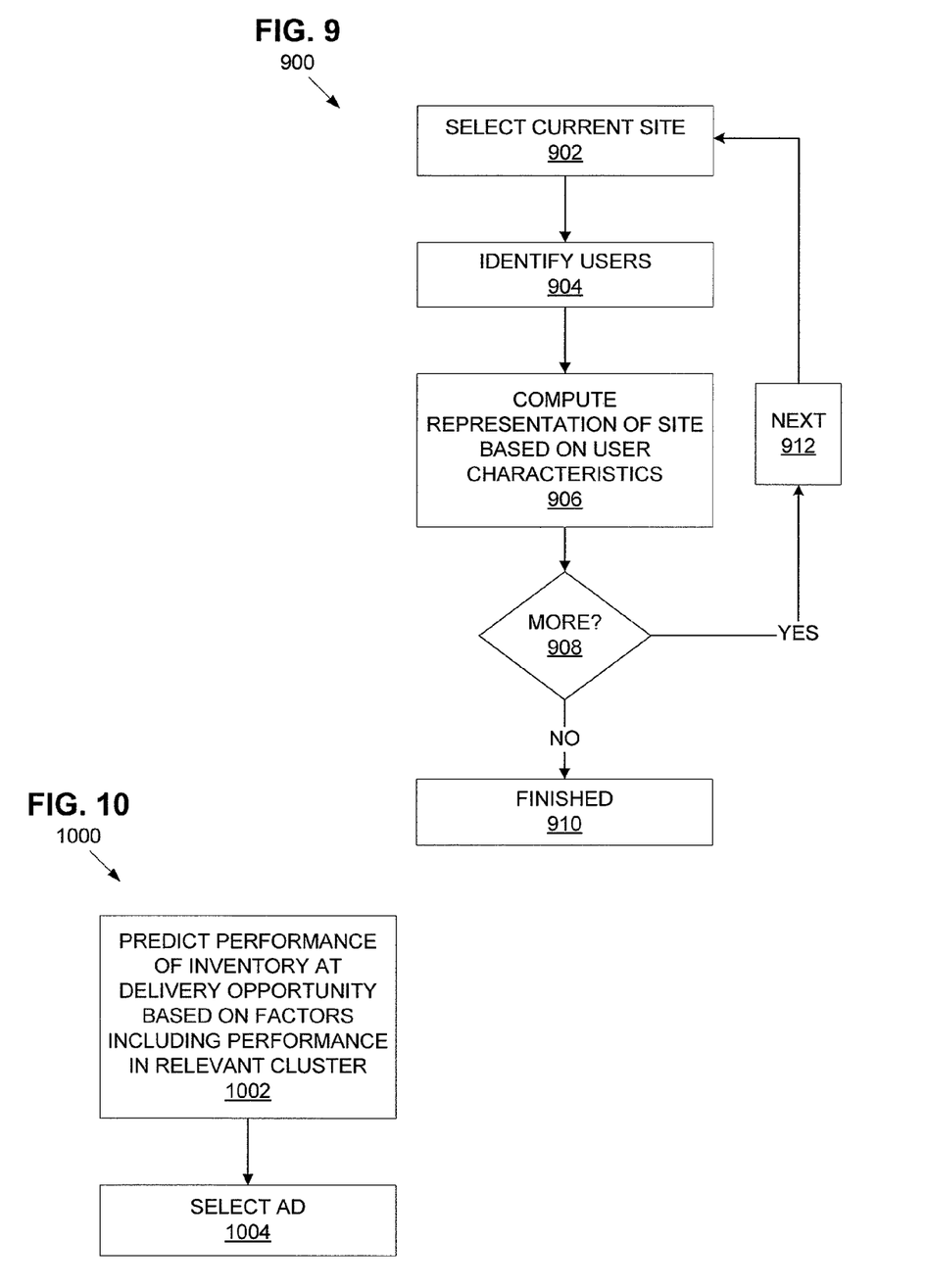
FIG. 9 is a flowchart of a method for representing sites according to an embodiment of the invention.
FIG. 10 is a flowchart of a method for selecting sites according to an embodiment of the invention.

In step 902, the module 110 selects a site to process. This is referred to as the current site. In step 904, the module 110 identifies all users from 802 that conducted one of the predetermined types of interactions with the current site. This is done by referencing the links 805, for example. Next, in step 906 the module 110 computes a mathematical representation of the current site according to prescribed characteristics of the users identified in 904. These prescribed characteristics may include some or all of the characteristics expressed in data 802. The computation 904 is discussed in greater detail below. The choice of how many characteristics from 802 to include in the computation 906 depends on factors such as the number of users that have these characteristics in common, statistical significance measures, how important these characteristics are to distinguish users in terms of serving different types of ads, etc.

Further new characteristics may be considered, with these new characteristics being derived based on transformations of observed characteristics or combinations of characteristics. Transformations may be mathematical such as square root or logarithms or other types such as creating a feature with a value of one for users living in urban households AND being over a certain income level, and zero for all other users. Without any intended limitation, feature, characteristic, dimension, and property are used herein interchangeably.

After step 906, step 908 asks if there are more sites from 804 to process. The operations 900 may be performed for some or all of the sites 804. If there are more sites to process according to step 908, step 912 advances to the next site, and then returns to step 902 where this site becomes the current site. When step 908 finds that step 906 has processed all sites 804, or all desired sites from 804, then the operations are finished as shown by 910.

Figure 6:
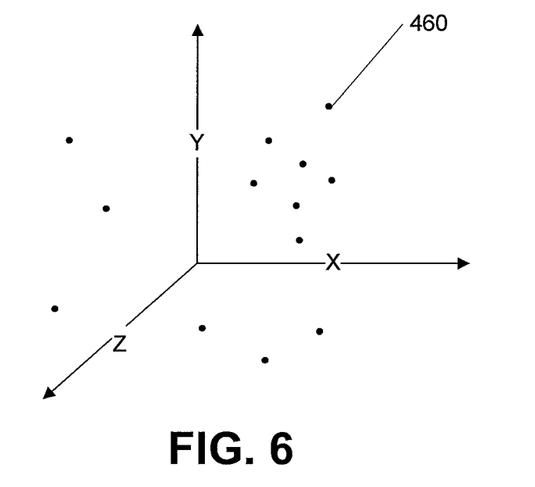
FIG. 6 is a perspective view of an exemplary mathematical representation of sites according to an embodiment of the invention.

As for computations of step 906, these may be carried out in different ways. In one example, the module 110 represents each site by a point or a vector in an N-dimensional space. Each dimension on the N-space corresponds to a different feature or characteristic of users having had the predetermined type of interactions with that site. For example, one dimension may be gender, another dimension age, another dimension income range, etc. FIG. 6 shows an example of this, where there are three dimensions, and a point 460 represents an exemplary one of many represented sites. Each site's feature vector is computed based on the feature vectors of all the users who have interacted with the site.

In this regard, one example is to compute the feature of the site as an average of the feature of the users who conducted the required type of interactions with that site. For example, the age dimension of the site may be established as the average of all the users who have interacted with the site. Further, multiple additional dimensions may be computed for a site based on a single user's feature. For example, from the age of the user, one may compute four different features or dimensions for the site, such as the maximum age, minimum age, average age, and standard deviation in age of users on that site. In an embodiment, the site's vector may be computed as a percentage of the users having that particular characteristic compared to the average across the entire known universe for that features. For example, for gender, if the universe has 50% male and 50% female, but the site has 30% male and 70% female users, then the value for the "male" gender characteristic would be 30%÷50%=0.6, and the value for the "female" gender characteristic would be 70%÷50%=1.4. This technique standardizes and calibrates the feature values across different sites so that they are comparable.

Cluster Sites

Figure 7:
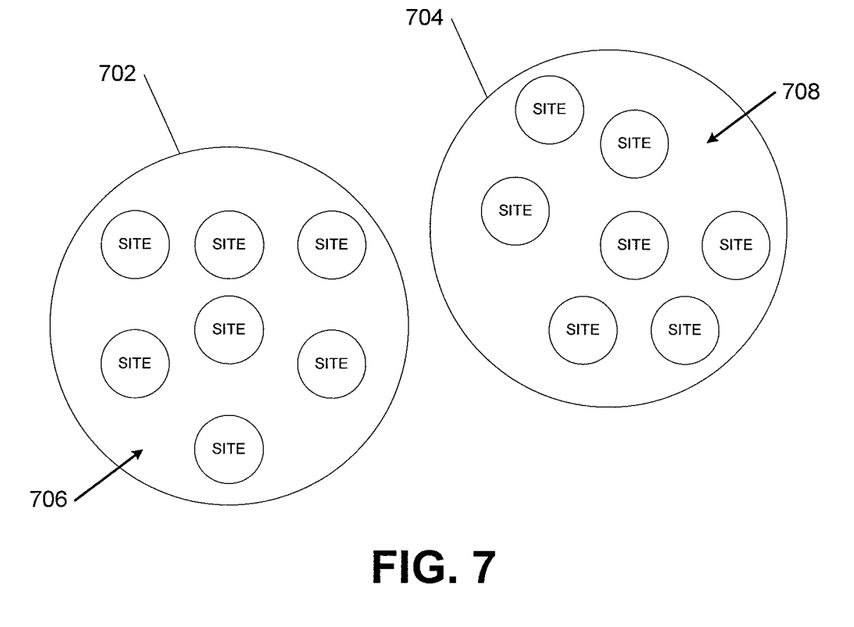
FIG. 7 is a diagram illustrating clusters of sites according to an embodiment of the invention.

Referring to FIG. 5, after quantifying the sites in step 504, step 506 clusters the sites. Namely, the module 110 applies prescribed criteria to the representations calculated in 506 in order to identify "clusters" of the sites. The clusters of sites are sites deemed to be similar according to certain criteria. FIG. 7 shows an example of two clusters 702, 704 resulting from step 506, each cluster containing a respective grouping of various sites 706, 708.

The module 110 may perform clustering by various techniques, with one example including k-means clustering. As alternatives to k-means clustering, other techniques may be used to form clusters, such as hierarchical clustering, Fuzzy c-means clustering, QT clustering, etc.

The criteria for obtaining the clusters of desired sizes includes stated goals such as the number of desired clusters, the desired or minimum and maximum number of sites per cluster, the minimum distance between clusters and within clusters, within-class and between-class scatter matrices which compute, Fisher linear discriminant analysis, etc.

As for minimum distance between clusters and within clusters, these may be based upon a computation of Euclidean distance between the two points representing the sites or the cosine of the angle between the vectors of two sites. In contrast to the Euclidean distance measure and the cosine, a variety of other techniques may be applied, with some examples including the Minkowski distance which is a generalization of the Euclidean distance, the Manhattan distance, the Jacard index, Mahalanobis distance, maximum norm, the Hamming distance, etc.

In one example, clustering is recomputed or adjusted over time in response to metrics including the performance history of ads across the clusters. The re-computation or adjustment may be performed, for example, based upon the same metrics as described above for initial computation of clusters.

Different emphasis may be applied to different user characteristics in order to give these user characteristics more or less weight in the clustering, which would result in a different set of resultant clusters. Cluster sizes, and namely how many sites are in the various clusters, are controlled by parameters such as k value in the case of k-means clustering. The k value also determines the number of clusters. Inputs such as the weighting of user characteristics, the cluster sizes, and others may be fixed, adjusted automatically by the module 110 (in "supervised learning"), or adjusted by human observation and control over the clustering process to reach the stated goals.

In one embodiment, the module 110 computes a confidence measure associated with each site's presence in a cluster. For example, a given site may have a 0.8 confidence of residing in cluster 702, and a 0.2 confidence of residing in cluster 704. In one embodiment, the module 110 considers a given site to be a member of the cluster with the greatest confidence measure. In a different embodiment, the presence of a given site in one particular cluster is not explicitly resolved.

In one sense, step 506 essentially characterizes sites in terms of the profiles of their audience rather than the content.

Receive Notice of Delivery Opportunity

In step 510, the ad manager 102 receives notice of an opportunity to deliver unidentified advertising to a given user via a given site. This opportunity may be referred to herein as an available advertising "slot."

More particularly, step 510 occurs when circumstances arise for delivery of an ad to a given user device 120 via a given site. For example, step 510 may occur when a publisher 118 receives a user request for new online content from the user device 120, and the notifies the ad manager 102. Examples of such user requests for online content include events such as a user activating a content viewing application 126, a content viewing application automatically requesting or receiving information, the user navigating or browsing to a new site or page, the user activating a hyperlink, the user beginning an online game, or the user conducting other activity that presents an occasion to deliver a new ad to user 102.

In a different example, step 510 may result from an event unrelated to user activity, such as where the publisher 118 or ad manager 102 automatically delivers new ads in response to a schedule or the passage of time, for example, irrespective of user requests for content. Ordinarily skilled artisans, having the benefit of this disclosure, may recognize further mechanisms for scheduling or triggering the delivery of online advertising to consumers in a manner that is appropriate to this disclosure.

At any rate, when notice of the opportunity to deliver an ad occurs, this is in regard to a specific user to whom an ad is intended to be delivered, and a specific site. This site will be referred to as the "current" site. The user will be referred to as the "current" user. As shown by 511, notices of advertising opportunities occur on a repeating basis.

Predict Performance and Select Ad

Responsive to the notice of step 510, the ad server 112 in step 514 selects an ad based upon factors including the ad having a prescribed performance history across one or more clusters containing the current site. In one example, step 514 may be implemented by the operations 1000 of FIG. 10.

Referring to FIGS. 5 and 10, the ad server 112 or the module 110 in step 1002 predicts how well ads in the inventory 108 will perform at the current site. This is based upon how well each ad in the inventory 108 has performed in the cluster or clusters containing the current site. Performance history may be rated according to any or all of the data 806 explained above, or any combinations of such data or derivations or calculations based upon such data.

In the example where step 506 resolves cluster membership of the current site into a single cluster, then step 1002 predicts performance of ads 108 across that particular cluster. In the example where step 506 identifies multiple clusters containing the current site, each having a different confidence measure, then step 1002 may condition the performance of a given ad in each cluster by the confidence of that cluster. A new site that was not involved in the clustering process in the past can be assigned a cluster based on which cluster centroid is the closest to the site's vector based on the distance measure used during the clustering.

The use of confidence measures is explained further by an example. In this example, the current site has a 0.8 confidence of residing in cluster 702, and a 0.2 confidence of residing in cluster 704. A given ad in the inventory experienced a 5% CTR across the cluster 702, and a 10% CTR across the cluster 704. By computing a weighted average of the CTRs with the confidence being the weights, this yields (0.8*5%+0.2*10%)÷(0.8+0.2)=6%. Instead of the normalization in this example, some other alternatives for combining confidence measure and performance include picking the minimum or maximum CTR, or the CTR of the cluster with the higher confidence or any mathematical form that can be fitted based on regression or similar method to data that compares predicted CTR with observed CTRs.

In step 1002, then, the ad server 112 may be seen as using the cluster information computed in 506 as a proxy for small sites with insufficient performance history regarding ads.

In step 1004, the ad server 112 or the module 110 selects at least one ad from the inventory 108 to deliver in response to the opportunity stated in step 510. This selection is made, at least in part, based on the performance predicted in step 1002. In one example, the ad server 112 in step 1004 selects the ad 108 with the highest predicted performance. In one example of eCPM (effective cost per thousand impressions) ranking, the ad with the highest product/multiplication of CPC (cost per click) bid and predicted CTR performance is selected.

In one alternative or additional embodiment, the clustering operation 506 may be performed separately for different advertisers 151, according to the specific requirements of each advertiser 151. This produces different sets of clusters for different advertisers 151. Thus, clustering may be performed with emphasis on one user characteristic or another according to the user characteristics that are relevant for a given advertiser 151. In this embodiment, the prediction operation 1002 is performed differently for different ads. Namely, for ads associated with a particular advertiser, the prediction operation uses the clusters computed for that particular advertiser.

In one example, one or both of steps 1002 and 1004 are performed without regard to the characteristics of the individual, current user. Although characteristics of the current user (along with characteristics of many other uses) may or may not have been considered in developing the clusters in step 506, information about the individual user need not be considered at the time of delivering the ad, such as steps 514, 516. This is one advantage of the method 500, since it does not require information about the user to whom the ad is to be placed, and therefore the method is still beneficial for users for which available information is limited or missing.

In a further embodiment, one or both of steps 1002, 1004 may additionally consider characteristics about the given user in predicting ad performance and selecting an ad. In one example, only responsive to missing or incomplete information about the given user does the module 110 consider performance history of ads at the clusters as a proxy for the given user. As described above, the ad manager 102 may be seen as using the cluster information from 506 as a proxy for having incomplete information about the current user.

Transmit Ad

In step 516, the ad server 112 transmits the ad that was selected in step 514. In one example, the ad server 112 transmits the selected ad either directly to the user device 120 and more particularly to the content viewing application 126. In a different example, the ad server 112 transmits the selected ad via one of the publishers 118 for delivery to the current user and current site. In still another example, the ad server 112 transmits a bid to deliver the selected ad to the current user at the current site. This bid may be transmitted to an ad exchange such as the AdECN™ exchange, Right Media™, ADSDAQ™ Exchange, Doubleclick™ exchange, etc. Step 516 may also be carried out by different mechanisms for delivering ads, many of which will be familiar to ordinarily skilled artisans having the benefit of this disclosure.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the invention, and the scope of the invention fully encompasses other embodiments which may become obvious to those skilled in the art, and that the scope of the invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, devices, circuits, and process steps described herein may be implemented as electronic hardware, computer software, or combinations of both. To clearly illustrate this interchangeability of hardware and software, various illustrative components, blocks, devices, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The claimed invention is:

1. A computer-executed method comprising:
  receiving, by metadata storage of an advertisement manager system, first data describing characteristics associated with users;
  receiving, by the metadata storage, second data listing a set of sites and a plurality of links between the first and second data;
  for each site, computing by an analysis server of the advertisement manager system, based on the links between the first data and the second data specifying that a set of the users had an interaction with such site, a quantification for the site resulting from transformation of different combinations of characteristics, which are associated with the associated set of users including any of gender, age, or income range, into different feature values;
  identifying, by the analysis server, clusters of sites by applying prescribed criteria to the quantification computed and stored for each site in the metadata storage, wherein each cluster, of the clusters of sites identified, includes a grouping of sites that have similar quantifications;
  after identifying clusters of sites, receiving, by an advertisement server of the advertisement manager system, a notice of an opportunity for ad delivery to a current site being accessed by a current user using a user device;
  responsive to the notice of the opportunity, selecting, by the advertisement server, at least one ad, from an inventory of ads in advertisement storage of the advertisement manager system, for delivery to the current site being accessed by the current user based on a predicted performance of the at least one ad at the current site, said selecting the at least one ad includes:
    identifying, from the stored identifications of clusters of sites multiple clusters that contain the current site;
    computing confidence measures for the multiple clusters, each of the confidence measures quantifying a confidence of the current site's presence in each cluster of the multiple clusters;
    determining performance history measures of the at least one ad at the multiple clusters, each of the performance history measures specifying how well the at least one ad has performed across the plurality of sites and users of each cluster of the multiple clusters based on the linked first and second data of each cluster;
    computing a weighted average of the performance history measures with the confidence measures being weights; and
    computing the predicted performance of the at least one ad at the current site based on the weighted average, wherein the at least one ad is selected for delivery to the current site based on the weighted average; and transmitting, by the computer system, the selected at least one ad to the user device for display to the current user at the current site.

2. The method of claim 1, the sites including any of: web sites, web pages, e-books or pages or chapters or other subdivisions of e-books, television programs, automated applications programmed to gather information via the Internet and display gathered information to users, or another interactive content delivery site.

3. The method of claim 1, wherein said selecting of the at least one ad is performed without evaluating the characteristics of the current user associated with the current site at which the selected ad is transmitted.

4. The method of claim 1, wherein the interaction includes at least one of: visiting the site, clicking on at least one ad delivered to the site, receiving presentation of at least one ad at the site, executing at least one purchase at the site, leaving at least one comment via the site, or conducting at least one search via the site.

5. The method of claim 1, wherein the quantification is further computed based on data other than data classifying content of the current site.

6. The method of claim 1, wherein selecting the at least one ad comprises:
   Identifying a complete performance history of ads associated with the current site; and
   in response to an incomplete performance history of ads associated with the current site, using a performance history of ads in the inventory of ads associated with sites of the cluster as a proxy performance history for the current site.

7. The method of claim 1, wherein the selecting further comprises:
   evaluating information about the current user at the current site;
   wherein in response to the information being incomplete, using performance history of ads, in the inventory of ads associated with the sites of the cluster that contains the current site, as a proxy for the information about the current user.

8. The method of claim 1, further comprising:
   transmitting, by the advertisement manager system, to a set of advertisement manager systems a bid for delivery of the at least one ad selected to the current user at the current site.

9. The method of claim 1, wherein the characteristics associated with the set of users comprise at least one of: an identifier, gender, age, browsing history, purchase history, user geographical location, income range, user demographics, or habits of content viewing.

10. The method of claim 1, wherein the prescribed criteria includes at least one of a number of clusters, a number of sites per cluster, or a minimum distance between the clusters of sites and within the clusters of sites.

11. The method of claim 1, wherein the performance history measure includes at least one of: a click-through rate (CTR) or a conversion rate.

12. The method of claim 1, wherein the set of common characteristics include any of gender, age, browsing history, purchase history, user geographical location, income range, user demographics, or habits of content viewing; and
   wherein computing the quantification for the site based on the set of common characteristics includes any of calculating a standard deviation associated with the set of common characteristics or calculating a percentage of the subset of users having the set of common characteristics compared to a universal average of universal users.

13. The method of claim 1, wherein identifying the clusters of sites comprises:
   applying a weight to one or more of the characteristics associated with the subset of the users to generate different resultant clusters in said determining of the clusters of sites.

14. The method of claim 1, wherein computing the quantification for each site comprises:
   representing the site by a vector in an N-dimensional space, wherein each dimension of the N-dimensional space corresponds to a different characteristic of the characteristics associated with the subset of the users; and
   computing the quantification based on the vector.

15. One or more non-transitory memories having stored thereon instructions, which when executed by an advertisement manager system, causes the advertisement manager to perform a method, comprising:
   instructions for receiving, by metadata storage of the advertisement manager system, first data including characteristics associated with users where one or more of the users have conducted one or more interactions;
   instructions for receiving, by the metadata storage, second data listing a set of sites and a plurality of links between the first and second data;
   instructions for, for each site computing, based on links between the first data and the second data specifying that a set of the users had an interaction with such site, a quantification for the site resulting from transformation of different combinations of characteristics, which are associated with the associated set of users including any of gender, age, or income range, into different feature values;
   instructions for, after identifying clusters of sites, identifying clusters of sites by applying prescribed criteria to the quantification computed and stored for each site in the metadata storage, wherein each cluster, of the clusters of sites identified, includes sites that have similar quantifications;
   instructions for receiving, by an advertisement server of the advertisement manager system, a notice of an opportunity for ad delivery to a current site being accessed by a current user using a user device;
   instructions for, responsive to the notice of the opportunity, selecting by the advertisement server at least one ad, from an inventory of ads in advertisement storage of the advertisement manager system, for delivery to the current site being accessed by the current user based on a predicted performance of the at least one ad at the current site, said instructions for selecting the at least one ad includes:
      instructions for identifying, from the stored identifications of clusters of sites, multiple clusters that contain the current site;
      instructions for computing confidence measures for the multiple clusters, each of the confidence measures quantifying a confidence of the current site's presence in each cluster of the multiple clusters;
      instructions for determining performance history measures of the at least one ad at the multiple clusters, each of the performance history measures specifying how well the at least one ad has performed across the plurality of sites and users of each cluster of the multiple clusters based on the linked first and second data of each cluster;
instructions for computing a weighted average of the performance history measures with the confidence measures being weights; and
instructions for computing the predicted performance of the at least one ad at the current site based on the weighted average, wherein the at least one ad is selected for delivery to the current site based on the weighted average; and
instructions for transmitting the selected at least one ad to the current user at the current site.

16. The article of manufacture of claim 15, wherein the operations further including:
adjusting the cluster determined in response to metrics, the metrics including performance history measures of the inventory of ads associated with sites in the clusters of sites.

17. The article of manufacture of claim 15, wherein the characteristics associated with the users comprise at least one of: an identifier, gender, age, browsing history, purchase history, user geographical location, income range, user demographics, or habits of content viewing.

18. An apparatus, comprising:
digital data storage;
metadata storage; and
at least one processor coupled to the storage, the processor programmed to:
into the metadata storage, receive first data including characteristics associated with a set of users;
into the metadata storage, receive second data listing a set of sites and a plurality of links between the first and second data;
for each site, compute, based on links between the first data and the second data specifying that a set of the users had an interaction with such site, a quantification for the site resulting from transformation of different combinations of characteristics, which are associated with the associated set of users including any of gender, age, or income range, into different feature values;
after identifying clusters of sites, identify clusters of sites by applying prescribed criteria to the quantification computed and stored for each site in the metadata storage, wherein each cluster, of the clusters of sites identified, includes a grouping of sites that have similar quantifications;
receive a notice of an opportunity for ad delivery to a current site being accessed by a current user using a user device; and
responsive to the notice of the opportunity, select at least one ad, from an inventory of ads, for delivery to the current site being accessed by the current user based on a predicted performance of the at least one ad at the current site, said select the at least one ad includes:
identify, from the stored identifications of clusters of sites, multiple clusters that contain the current site;
compute confidence measures for the multiple clusters, each of the confidence measures quantifying a confidence of the current site's presence in each cluster of the multiple clusters;
determine performance history measures of the at least one ad at the multiple clusters, each of the performance history measures specifying how well the at least one ad has performed across the plurality of sites and users of each cluster of the multiple clusters based on the linked first and second data of each cluster
compute a weighted average of the performance history measures with the confidence measures being weights; and
compute the predicted performance of the at least one ad at the current site based on the weighted average, wherein the at least one ad is selected for delivery to the current site based on the weighted average; and
transmit the selected at least one ad to the current user at the current site.

19. The apparatus of claim 18, wherein the processor is further programmed to:
adjust the clusters of sites in response to metrics, the metrics including performance history of the inventory of ads associated with sites in the clusters of sites.

20. The apparatus of claim 18, wherein the characteristics associated with the users comprise at least one of: an identifier, gender, age, browsing history, purchase history, user geographical location, income range, user demographics, or habits of content viewing.

21. The apparatus of claim 18, wherein the performance history measure includes at least one of: a click-through rate (CTR) or a conversion rate.

22. The apparatus of claim 18, wherein the set of common characteristics include any of gender, age, browsing history, purchase history, user geographical location, income range, user demographics, or habits of content viewing; and
wherein computing the quantification for the site based on the set of common characteristics includes any of calculating a standard deviation associated with the set of common characteristics or calculating a percentage of the subset of users having the set of common characteristics compared to a universal average of universal users.

23. The apparatus of claim 18, wherein identifying the clusters of sites comprises:
applying a weight to one or more of the characteristics associated with the subset of the users to generate different resultant clusters in said determining of the clusters of sites.

24. The apparatus of claim 18, wherein computing the quantification for each site comprises:
representing the site by a vector in an N-dimensional space, wherein each dimension of the N-dimensional space corresponds to a different characteristic of the characteristics associated with the subset of the users; and
computing the quantification based on the vector.

* * * * *